United States Patent
Hsu et al.

(10) Patent No.: US 9,122,501 B1
(45) Date of Patent: Sep. 1, 2015

(54) SYSTEM AND METHOD FOR MANAGING MULTIPLE BIOS DEFAULT CONFIGURATIONS

(71) Applicant: Quanta Computer Inc., Tao Yuan Shien (TW)

(72) Inventors: Chin-Huai Hsu, Tao Yuan Chien (TW); Wei-Yu Chien, Tao Yuan Shien (TW); Chun-Hung Tsai, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 0 days.

(21) Appl. No.: 14/542,365

(22) Filed: Nov. 14, 2014

Related U.S. Application Data

(60) Provisional application No. 62/047,521, filed on Sep. 8, 2014.

(51) Int. Cl.
G06F 9/00 (2006.01)
G06F 9/24 (2006.01)
G06F 15/177 (2006.01)
G06F 9/445 (2006.01)

(52) U.S. Cl.
CPC .................... *G06F 9/44505* (2013.01)

(58) Field of Classification Search
CPC .. G06F 9/4403; G06F 9/4416; G06F 9/44505
USPC ................................................ 713/1, 2, 100
See application file for complete search history.

(56) References Cited

U.S. PATENT DOCUMENTS

| | | | | |
|---|---|---|---|---|
| 6,161,175 A | * | 12/2000 | Kim et al. | 713/1 |
| 6,401,198 B1 | * | 6/2002 | Harmer et al. | 713/1 |
| 6,658,562 B1 | * | 12/2003 | Bonomo et al. | 713/1 |
| 6,718,464 B2 | * | 4/2004 | Cromer et al. | 713/2 |
| 6,892,323 B2 | | 5/2005 | Lin | |
| 7,290,258 B2 | | 10/2007 | Steeb et al. | |
| 7,440,998 B2 | * | 10/2008 | Hiray et al. | 709/203 |
| 7,873,824 B2 | | 1/2011 | Johnson et al. | |
| 7,904,708 B2 | * | 3/2011 | Harmer | 713/2 |
| 7,987,353 B2 | | 7/2011 | Holdaway et al. | |
| 8,078,859 B2 | | 12/2011 | Wang | |
| 8,161,315 B2 | * | 4/2012 | Holdaway et al. | 714/4.11 |
| 8,423,756 B2 | | 4/2013 | Harmer | |
| 8,671,271 B2 | | 3/2014 | Sever et al. | |
| 8,874,892 B1 | * | 10/2014 | Chan et al. | 713/2 |
| 2011/0225274 A1 | | 9/2011 | Dvorkin et al. | |
| 2013/0173897 A1 | | 7/2013 | Wang | |
| 2013/0305027 A1 | | 11/2013 | Jiang et al. | |

(Continued)

OTHER PUBLICATIONS

Bach, "How it works: O.C. profiles", Retrieved from: http://www.pugetsystems.com/labs/articles/How-it-works-O-C-Profiles-90/ (Jul. 25, 2011). (4 pages).

(Continued)

*Primary Examiner* — Mark Connolly
(74) *Attorney, Agent, or Firm* — Novak Druce Connolly Bove + Quigg LLP

(57) ABSTRACT

A plurality of BIOS default configurations may be is stored in a BIOS of the computer system. A particular BIOS default configuration may be selected from the plurality of BIOS default configurations based at least in part on a server identification (ID) of the computer system or a user command. The computer system is initialized with the particular BIOS default configuration.

24 Claims, 9 Drawing Sheets

(56) References Cited

U.S. PATENT DOCUMENTS

2014/0082346 A1 3/2014 Tao et al.
2014/0230078 A1 8/2014 Graham

OTHER PUBLICATIONS

Cisco, "UCS Manager GUI Configuration Guide, Release 2.0: Configuring server related policies", Retrieved from: http://www.cisco.com/c/en/us/td/docs/unified_computing/ucs/sw/gui/config/guide/2-0/b_UCSM_GUI_Configuration_Guide_2_0/b_UCSM_GUI_Configuration_Guide_2_0_chapter_011100.html#d129007e28a1635 (Sep. 4, 2012). (58 pages).

IBM, "Advanced Settings Utility: User's Guide", Retrieved from: https://publib.boulder.ibm.com/infocenter/toolsctr/v1r0/topic/asu/asu_guide.pdf (Jun. 2010). (110 pages).

* cited by examiner

SYSTEM AND METHOD FOR MANAGING MULTIPLE BIOS DEFAULT CONFIGURATIONS

BACKGROUND

1. Field

This application relates to a server device, and more particularly to a method of managing Basic Input/Output System (BIOS) default configurations for the server device.

2. Background

A number of techniques have been developed to remotely manage the operation of computer servers in a manner that provides accessibility, consistency, and efficiency. Remote management allows the removal of input/output interfaces (e.g., monitors, keyboards, and mice) for the servers. For example, large data centers containing numerous rack servers are commonly managed using a variety of remote management tools, such as simple terminal connections, remote desktop applications, and software tools used to configure, monitor, and troubleshoot server hardware and software.

In a typical computer system (e.g., a rack server in a data center) a BIOS software program is stored on a BIOS chip located on a motherboard of the computer system. The BIOS stores firmware executed when the computer system is first powered on along with a set of configurations specified for the BIOS. The BIOS firmware and BIOS configurations are stored in a non-volatile memory such as a non-volatile random-access memory (NVRAM) or a read-only memory (ROM). The BIOS typically recognizes, initializes, and tests hardware present in a given computing system based on the set of configurations. The BIOS then gives control of the computer system to an operating system (OS). The BIOS provides an interface that allows a variety of different parameters to be set. For example, the BIOS may be used to specify clock and bus speeds, specify what peripherals are attached to the computer system, specify monitoring of health (e.g., fan speeds and CPU temperature limits), and specify a variety of other parameters that affect overall performance and power usage of the computer system.

Rack servers may be used by different data centers with different computing needs. However, typical rack servers are preloaded with a single BIOS default configuration that may not be optimal for the differing needs of the customers. In addition, BIOS configurations for rack servers are often complicated and may be closely tied to hardware combinations in each rack server. Traditionally, the administrator needs a human-to-machine interface and an OS application to select the BIOS configurations for rack servers, which limits the initial configuration of the rack servers.

SUMMARY

The following presents a simplified summary of one or more embodiments in order to provide a basic understanding of present technology. This summary is not an extensive overview of all contemplated embodiments of the present technology, and is intended to neither identify key or critical elements of all examples nor delineate the scope of any or all aspects of the present technology. Its sole purpose is to present some concepts of one or more examples in a simplified form as a prelude to the more detailed description that is presented later.

In accordance with one or more aspects of the examples described herein, systems and methods are provided for managing Basic Input/Output System (BIOS) configurations for a computer system.

In an aspect, a method is provided for managing BIOS configurations for a computer system. The method includes defining a plurality of BIOS default configurations for the computer system. The method includes selecting a particular BIOS default configuration from the plurality of BIOS default configurations based at least in part on a server identification (ID) of the computer system or a user command. The method includes initializing the computer system with the particular BIOS default configuration.

In a related aspect, the method further includes obtaining the server ID of the computer system, where selecting the particular BIOS default configuration comprises selecting one of the plurality of BIOS default configurations that corresponds to the server ID of the computer system. In another related aspect, the method further includes storing a current index, where the current index value is determined based on the particular BIOS default configuration selected from the plurality of BIOS default configurations.

In another aspect, an apparatus is provided for managing BIOS configurations for a computer system. The apparatus includes at least one processor configured for defining a plurality of BIOS default configurations for the computer system, selecting a particular BIOS default configuration from the plurality of BIOS default configurations based at least in part on a server identification (ID) of the computer system or a user command, and initializing the computer system with the particular BIOS default configuration.

In yet another aspect, a non-transitory computer-readable medium is provided for managing BIOS configurations for a computer system. The non-transitory computer-readable medium stores executable instructions which cause a data processing device to define a plurality of BIOS default configurations for the computer system, select a particular BIOS default configuration from the plurality of BIOS default configurations based at least in part on a server identification (ID) of the computer system or a user command, and initialize the computer system with the particular BIOS default configuration

BRIEF DESCRIPTION OF THE DRAWINGS

These and other sample aspects of the present technology will be described in the detailed description and the appended claims that follow, and in the accompanying drawings, wherein:

DETAILED DESCRIPTION

The subject disclosure provides techniques for managing BIOS default configurations in accordance with the present technology. A BIOS of a computer system (e.g., a rack server) can be preloaded with a plurality of BIOS default configurations. The computer system can start up using one of the plurality of BIOS default configurations or can instead start up with a custom BIOS default configuration specified by a user (e.g., an administrator). In an alternative aspect, the computer system can be assigned with a server identification (ID) that corresponds to one of the plurality of BIOS default configurations. The BIOS can automatically select one of the plurality of BIOS default configurations based on at least a server ID of the computer system or a user command.

Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

Figure 1:
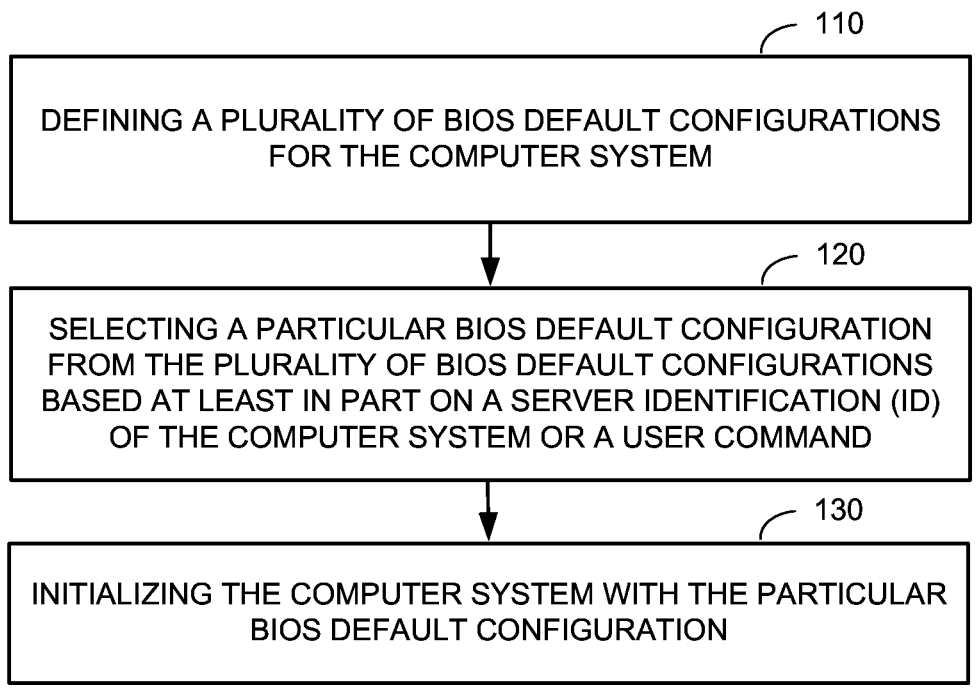
FIG. 1 illustrates an exemplary methodology for managing BIOS configurations for a computer system.

In accordance with one or more aspects of the implementations described herein, with reference to FIG. 1, a methodology 100 is shown for managing BIOS configurations for a computer system. The method 100 can involve, at step 110, defining a plurality of BIOS default configurations for the computer system. In a related aspect, the plurality of BIOS default configurations can correspond to a plurality of computer system types. In a related aspect, the plurality of BIOS default configurations can correspond to a plurality of server identifications (IDs). In a related aspect, the plurality of BIOS default configurations may be obtained from any storage device such as a BMC, a hard disk drive (HDD), an Electrically Erasable Programmable Read-Only Memory (EE-PROM), or a NVRAM accessible by the computer system. In a related aspect, any of the plurality of BIOS default configurations may be specified by a user.

The method 100 can involve, at step 120, selecting a particular BIOS default configuration from the plurality of BIOS default configurations based at least in part on a server ID of the computer system or a user command. In a related aspect, selecting the particular BIOS default configuration includes receiving a specified BIOS default configuration through a BMC from a user. In a related aspect, the specified BIOS default configuration is not one of the plurality of BIOS default configurations.

The method 100 can involve, at step 130, initializing the computer system with the particular BIOS default configuration.

The method 100 can further involve obtaining the server ID of the computer system, where selecting the particular BIOS default configuration includes selecting one of the plurality of BIOS default configurations that corresponds to the server ID of the computer system. The method 100 can further involve storing a current index, where the current index value is determined based on the particular BIOS default configuration selected from the plurality of BIOS default configurations.

Figure 2:
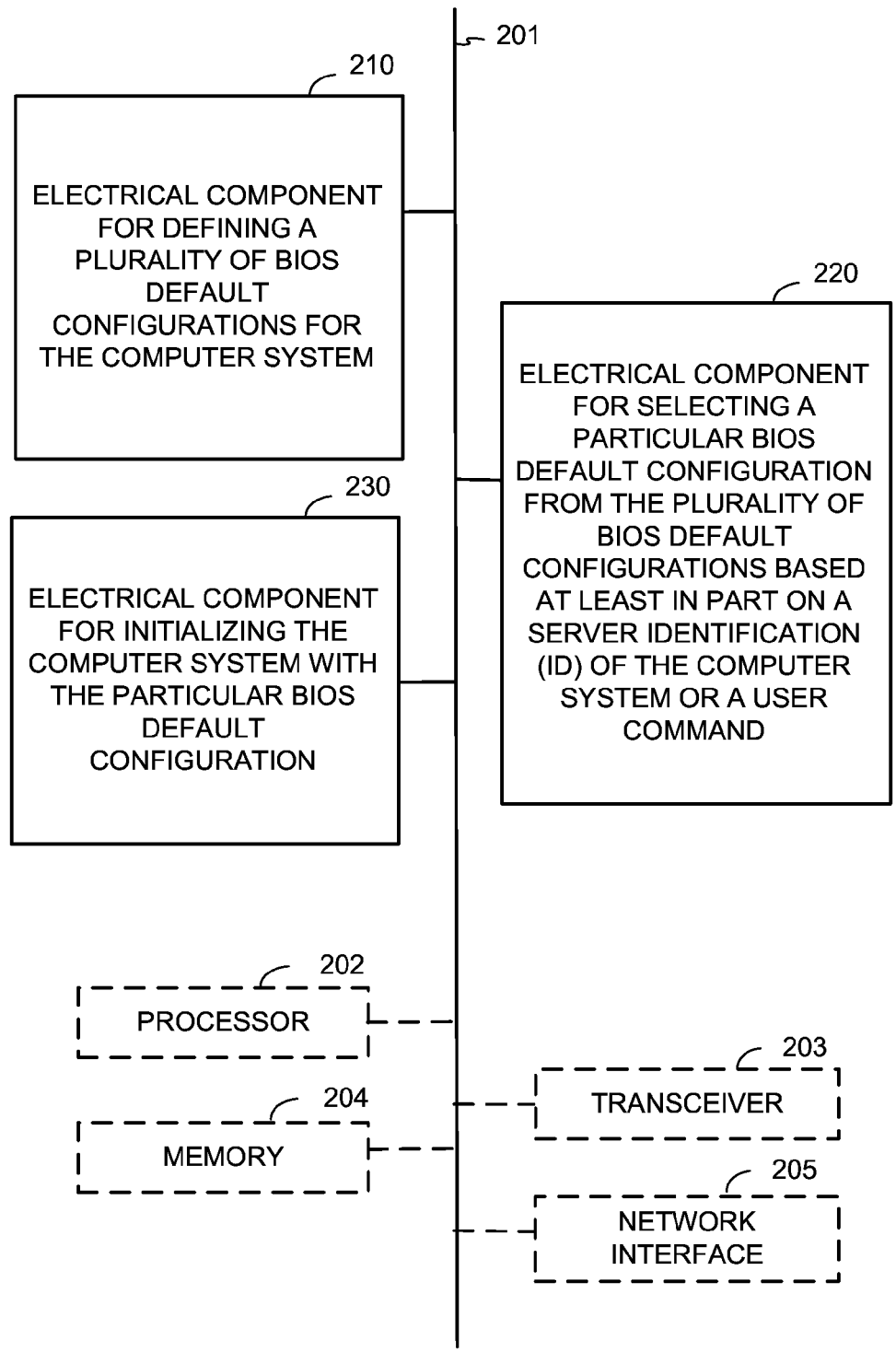
FIG. 2 illustrates an exemplary apparatus for managing BIOS configurations for a computer system in accordance with the methodology of FIG. 1.

In accordance with one or more aspects of the implementations described herein, FIG. 2 illustrates an exemplary apparatus for managing BIOS configurations for a computer system in accordance with the methodology of FIG. 1. The exemplary apparatus 200 can be configured as a computing device or as a processor or similar device/component for use within. In one example, the apparatus 200 can include functional blocks that can represent functions implemented by a processor, software, or combination thereof (e.g., firmware). In another example, the apparatus 200 can be a system on a chip (SoC) or similar integrated circuit (IC).

In one implementation, the apparatus 200 can include an electrical component or module 210 for defining a plurality of BIOS default configurations for the computer system.

The apparatus 200 can include an electrical component 220 for selecting a particular BIOS default configuration from the plurality of BIOS default configurations based at least in part on a server identification (ID) of the computer system or a user command.

The apparatus 200 can optionally include an electrical component 230 for initializing the computer system with the particular BIOS default configuration.

In further related aspects, the apparatus 200 can optionally include a processor component 202. The processor 202 can be in operative communication with the components 210-230 via a bus 201 or similar communication coupling. The processor 202 can effect initiation and scheduling of the processes or functions performed by electrical components 210-230.

In yet further related aspects, the apparatus 200 can include a radio transceiver component 203. A standalone receiver and/or standalone transmitter can be used in lieu of or in conjunction with the transceiver 203. The apparatus 200 can also include a network interface 205 for connecting to one or more other communication devices or the like. The apparatus 200 can optionally include a component for storing information, such as, for example, a memory device/component 204. The computer readable medium or the memory component 204 can be operatively coupled to the other components of the apparatus 200 via the bus 201 or the like. The memory component 204 can be adopted to store computer readable instructions and data for affecting the processes and behavior of the components 210-230, and subcomponents thereof, or the processor 202, or the methods disclosed herein. The memory component 204 can retain instructions for executing functions associated with the components 210-230. While shown as being external to the memory 204, it is to be understood that the components 210-230 can exist within the memory 204. It is further noted that the components in FIG. 2 can include processors, electronic devices, hardware devices, electronic sub-components, logical circuits, memories, software codes, firmware codes, etc., or any combination thereof.

Persons skilled in the art will appreciate that the functionalities of each component of the apparatus 200 can be implemented in any suitable component of the system or combined in any suitable manner.

Figure 3:
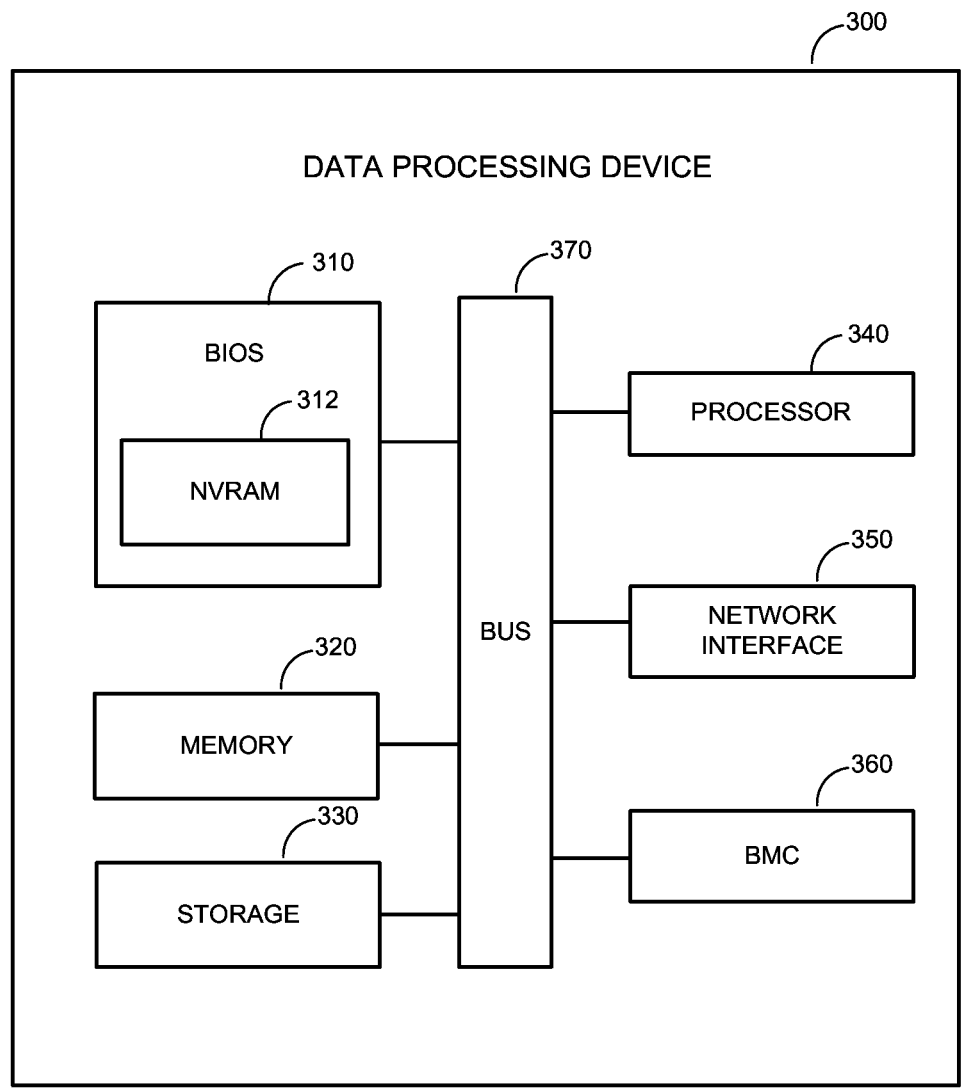
FIG. 3 illustrates a block diagram of an exemplary computer system.

FIG. 3 illustrates a block diagram of an exemplary computer system 300. The computer system 300 can include a processor 340, a network interface 350, a Baseboard Management Controller (BMC) 360, a memory 320, a storage 330, a BIOS 310, and a bus 370.

The computer system 300 can be, for example, a server (e.g., one of many rack servers in a data center) or a personal computer. The processor (e.g., central processing unit) 340 can retrieve and execute programming instructions stored in the memory 320 (e.g., random-access memory). The processor 340 can be a single CPU with a single processing core, a single CPU with multiple processing cores, or multiple CPUs. The storage 330 can include any form of non-volatile form of data storage such as a HDD or a flash drive. The bus 370 can transmit instructions and application data between computer components such as the processor 340, memory 320, storage 330, and networking interface 350.

The BIOS 310 can include a Basic Input/Output System or its successors or equivalents, such as an Extensible Firmware Interface (EFI) or Unified Extensible Firmware Interface (UEFI). The BIOS 310 can include a BIOS chip located on a motherboard of the computer system 300 storing a BIOS software program. The BIOS 310 can store firmware executed when the computer system is first powered on along with a set of configurations specified for the BIOS 310. The BIOS firmware and BIOS configurations can be stored in a non-volatile memory (e.g., NVRAM) 312 or a ROM.

The BIOS 310 can be loaded and executed as a sequence program each time the computer system 300 is started. The BIOS 310 can recognize, initialize, and test hardware present in a given computing system based on the set of configurations. The BIOS 310 can perform self-test, such as a Power-on-Self-Test (POST), on the computer system 300. This self-test can test functionality of various hardware components such as hard disk drives, optical reading devices, cooling devices, memory modules, expansion cards and the like. The BIOS can address and allocate an area in the memory 320 in to store an operating system (OS). The BIOS 310 can then give control of the computer system to the OS.

The BIOS 310 of the computer system 300 can include a BIOS configuration that defines how the BIOS 310 controls various hardware components in the computer system 300. The BIOS configuration can determine the order in which the various hardware components in the computer system 300 are started. The BIOS 310 can provide an interface that allows a variety of different parameters to be set, which can be different from parameters in a BIOS default configuration. For example, a user (e.g., an administrator) can use the BIOS 310 to specify clock and bus speeds, specify what peripherals are attached to the computer system, specify monitoring of health (e.g., fan speeds and CPU temperature limits), and specify a variety of other parameters that affect overall performance and power usage of the computer system.

The BMC 360 can be a specialized microcontroller embedded on the motherboard of a computer, such as a server. The BMC 360 can manage the interface between system management software and platform hardware. Different types of sensors built into the computer system can report to the BMC 360 on parameters such as temperature, cooling fan speeds, power status, operating system (OS) status, etc. The BMC 360 can monitor the sensors and have the ability to send alerts to an administrator via the network interface 350 if any of the parameters do not stay within preset limits, indicating a potential failure of the system. The administrator can also remotely communicate with the BMC 360 to take some corrective action such as resetting or power cycling the system to restore functionality.

Rack servers can be used by different data centers with different computing needs. However, typical rack servers are preloaded with a single BIOS default configuration that may not be optimal for various needs of different customers. In addition, BIOS configurations for rack servers are often complicated and can be closely tied to hardware combinations in each rack server. Traditionally, the administrator needs a human-to-machine interface and an OS application to select the BIOS configurations for rack servers, which limits the initial configuration of the rack servers.

In an exemplary implementation, the computer system 300 can write the plurality of BIOS default configurations to the BIOS 310. In a related aspect, the BMC 360 can write the plurality of BIOS default configurations without the use of an OS. In another related aspect, an application running on an OS can write the plurality of BIOS default configurations. In an exemplary implementation, the BIOS 310 of the computer system 300 can select the particular BIOS default configuration. In an exemplary implementation, the BIOS 310 can load the particular BIOS default configuration into the NVRAM 312 of the BIOS 310.

Figure 4:
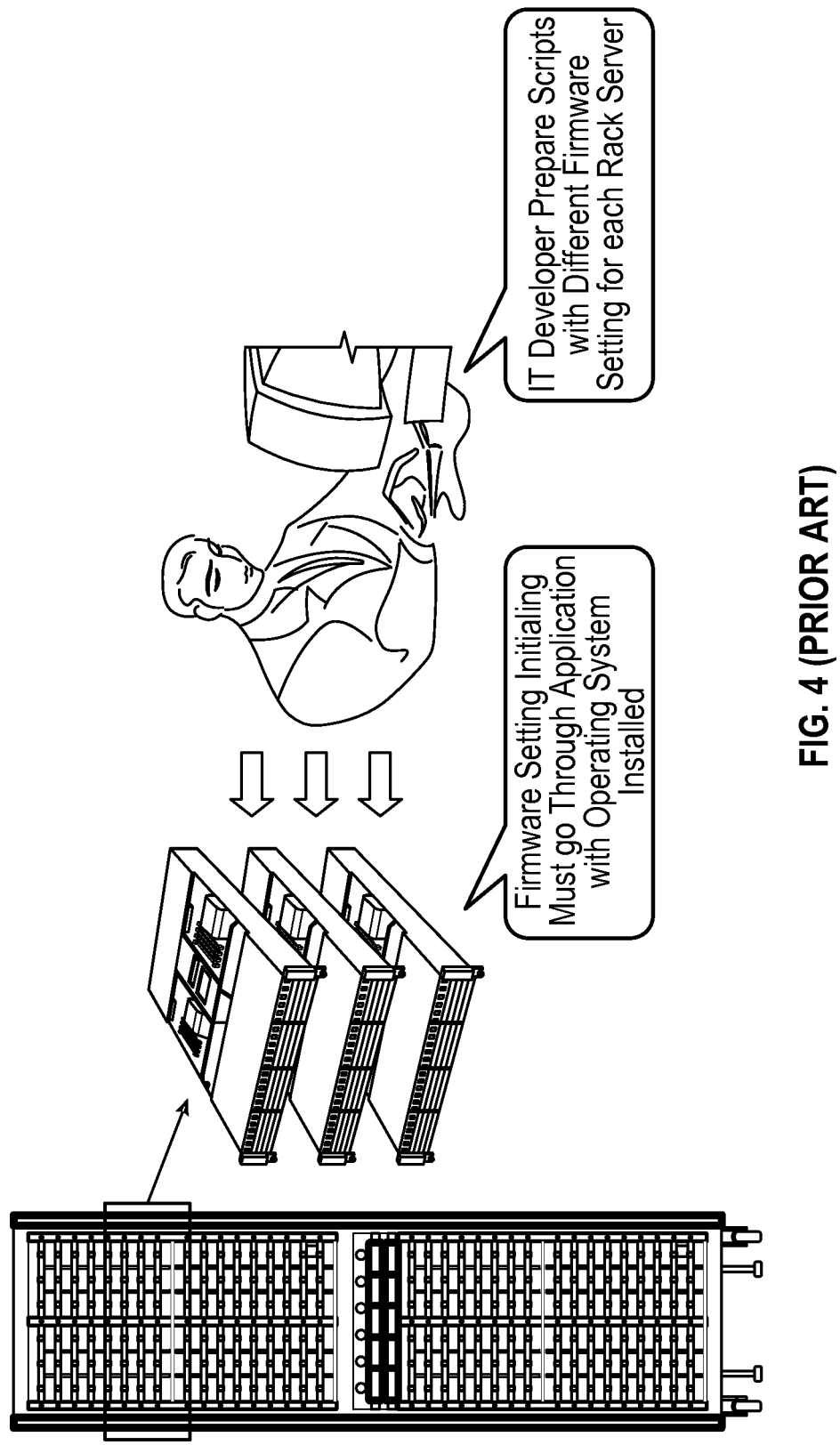
FIG. 4 illustrates an existing method of managing firmware settings.

FIG. 4 illustrates an existing method of managing firmware settings. A rack of servers in a data center typically holds large number of rack servers. The rack servers can have different hardware configurations or can be used for different purposes. For example, some rack servers can have more HDDs, memory capacity, or CPU cores than others. In another example, certain rack servers can be used for cloud storage, thus requiring less processing power, while others can be used for serving online games, thus requiring more processing power. Therefore, the rack servers can require different BIOS default configurations that are optimized for the different hardware configurations and for the different functionalities of the rack servers. A user, such as an information technology (IT) developer, can prepare scripts that provide a different firmware setting (including e.g., BIOS default configurations) for different rack servers. Typically, the firmware settings are installed via an OS application. This means that the OS must be loaded on each rack server before the firmware settings can be installed.

Figure 5:
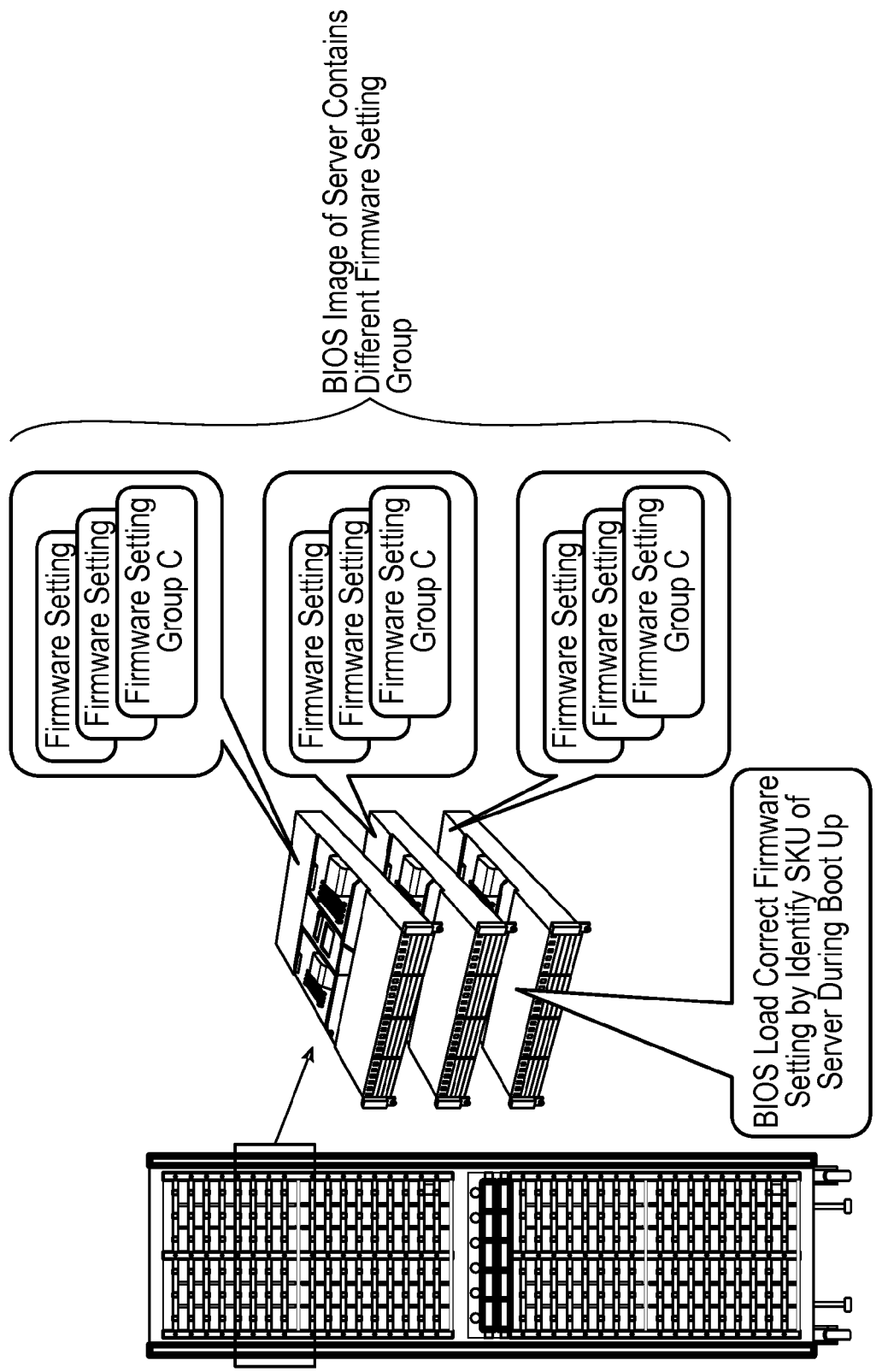
FIG. 5 illustrates an exemplary method for managing BIOS configurations for a computer system.

FIG. 5 illustrates an exemplary method for managing BIOS configurations for a computer system in accordance with the present technology. A computer system (e.g., a rack server) can be preloaded with a plurality of BIOS default configurations stored in a NVRAM. The server can be initialized by loading one of the plurality of BIOS default configurations. In an exemplary implementation, a computer system can be assigned with a server identification (ID) that corresponds to one of the plurality of BIOS default configurations. For example, a first BIOS default configuration can correspond to a server ID for a rack server with a large number of HDDs. In another example, a second BIOS default configuration can correspond to a server ID for a rack server with four dual-core CPUs. In yet another example, a third BIOS default configuration can correspond to a server ID for a rack server used for high-performance computer (HPC). The third BIOS default configuration can specify overclocked CPU and memory clock rates and increased CPU voltages. In yet another example, a fourth BIOS default configuration can correspond to a server ID for a rack server focused on power savings. The fourth BIOS default configuration can specify under-clocked CPU and memory clock rates and lowered CPU voltages. In a related aspect, the server ID can be assigned by an administrator based on the server's hardware configuration or functionality. The BIOS can identify the server ID during load up and automatically load one of the plurality of BIOS default configurations based at least in part on a server ID of the computer system.

Figure 6:
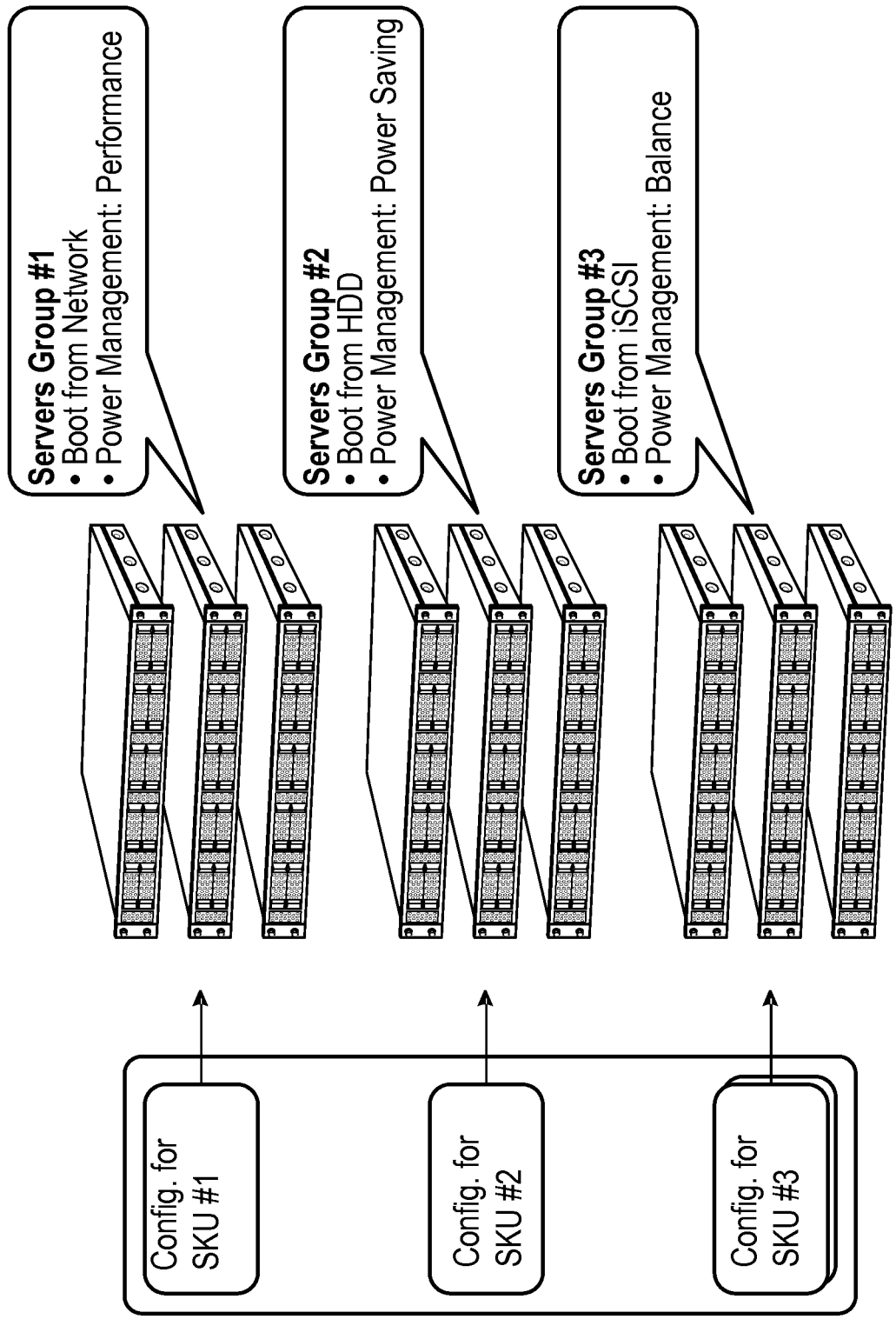
FIG. 6 illustrates an exemplary of multiple BIOS configurations for rack servers with different hardware configurations and functionalities.

FIG. 6 illustrates an exemplary of multiple BIOS configurations for rack servers with different hardware configurations and functionalities. For example, a first group of rack servers can be assigned a server ID of stock keeping-unit (SKU) #1 to boot from a network and have a performance oriented power management setting. A second group of rack servers can be assigned a server ID of SKU #2 to boot from a HDD and have a power saving oriented power management setting. A third group of rack servers can be assigned a server ID of SKU #3 to boot from an Internet Small Computer System Interface (iSCSI) and have a balanced power management setting. The present technology greatly increases the efficiency as well reduces the likelihood of errors in the process of configuring rack servers with the correct BIOS default configurations.

Figure 7:
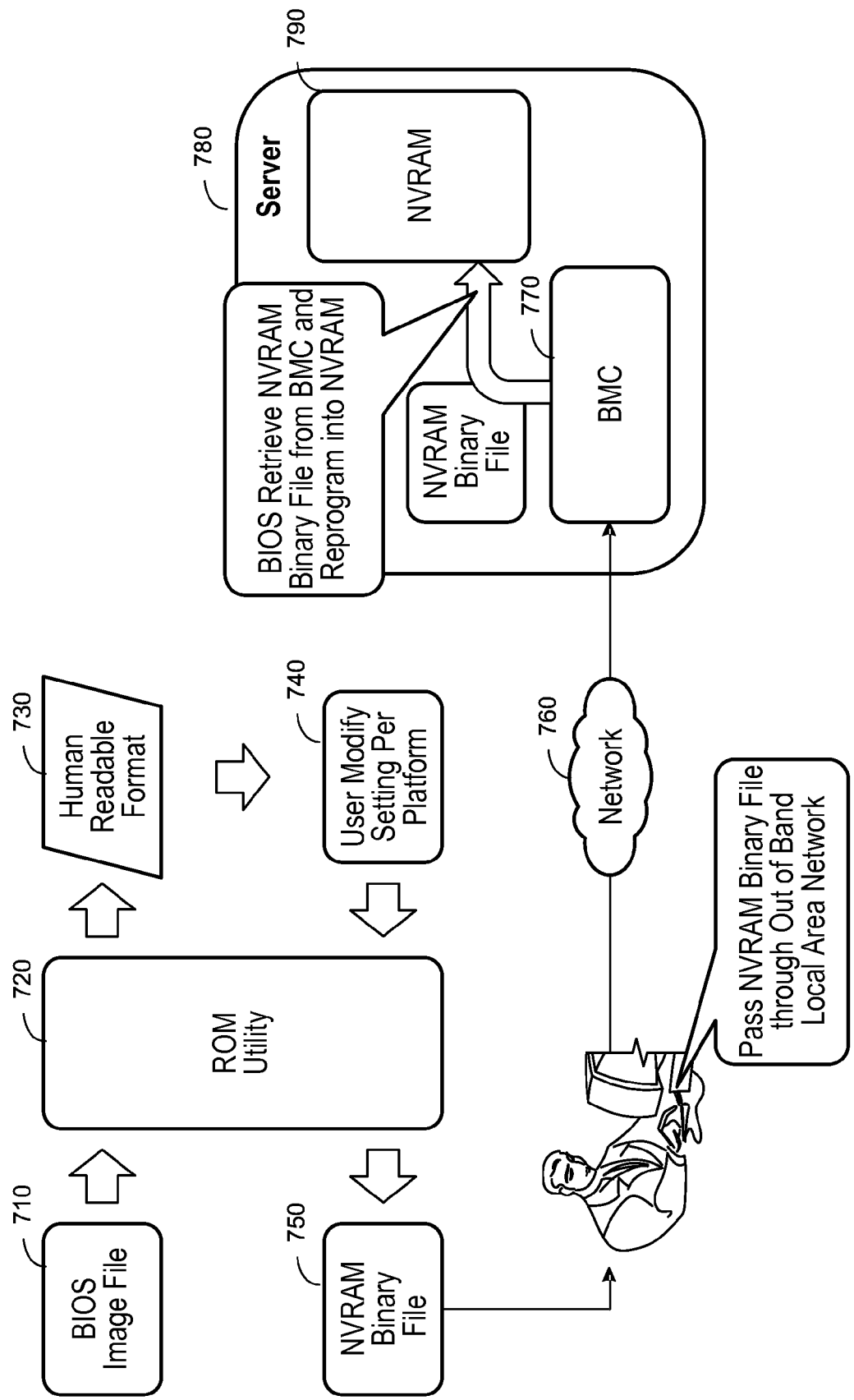
FIG. 7 illustrates a block diagram of an exemplary method for managing a BIOS default configuration for a computer system.

FIG. 7 illustrates a block diagram of an exemplary method for managing a BIOS default configuration for a computer system. For example, a BIOS image file 710 including a BIOS default configuration can be accessed by a ROM utility 720 and viewed in a human readable format 730. A user (e.g., an administrator) can create or modify 740 the BIOS default configuration using the ROM utility 720. The ROM utility 720 can output a NVRAM binary file 750 based on the user's creations or modifications of the BIOS default configuration. The NVRAM binary file 750 can be passed out-of-band (ie., a separate or dedicated network channel) through a local area network (LAN) 760 to a BMC 770 in a computer system (e.g., a rack server) 780. The BMC 770 can load the NVRAM binary file 750 including the BIOS default configuration created or modified by the user into a NVRAM 790 for a BIOS in the rack server 780.

Figure 8:
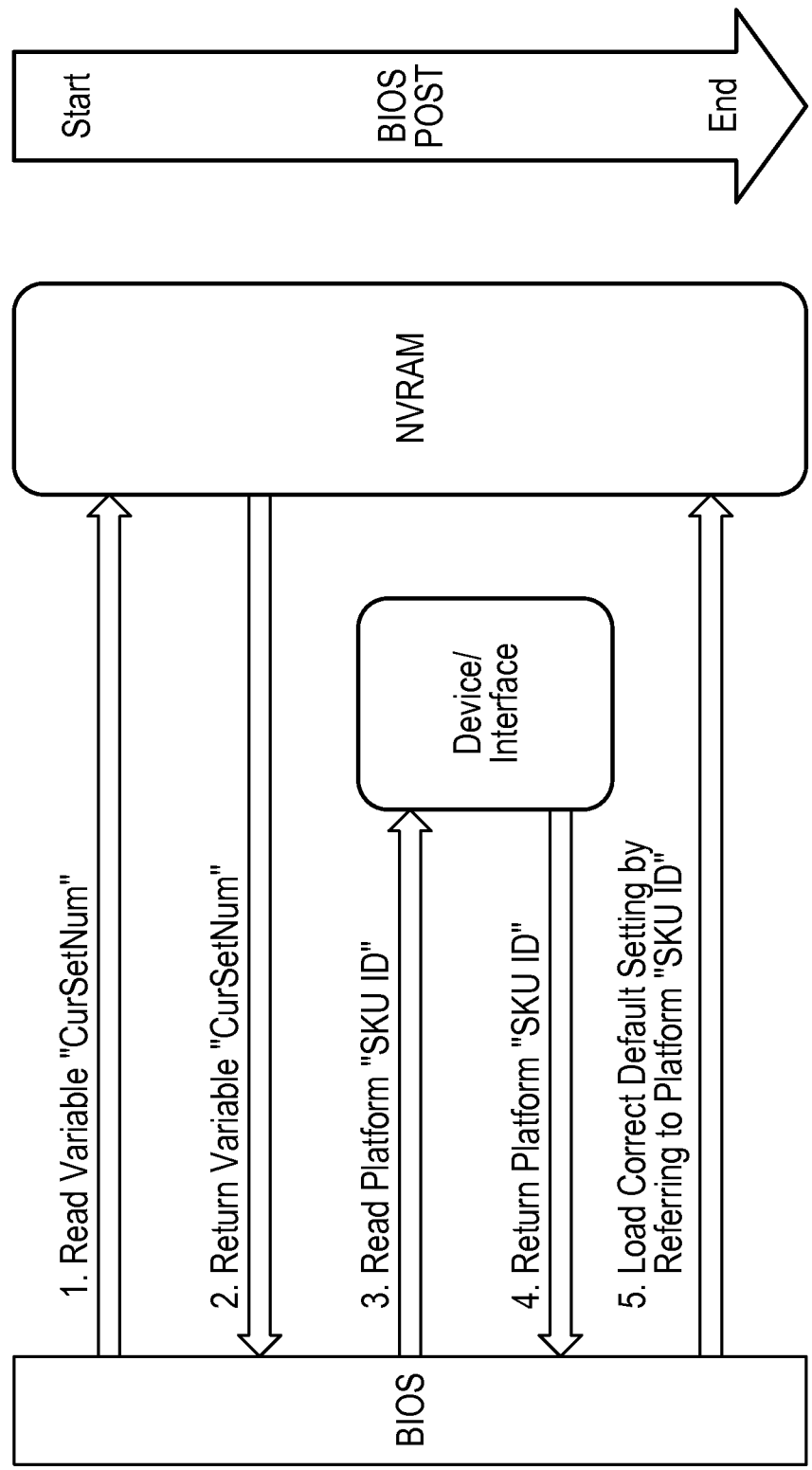
FIG. 8 illustrates a block diagram of an exemplary method for managing BIOS configurations for a computer system.

FIG. 8 illustrates a block diagram of an exemplary method for managing BIOS configurations for a computer system. In steps 1-2, a BIOS in a computer system can read a "CurSetNum" from a NVRAM for the BIOS. The CurSetNum can store an index number corresponding to which of a plurality of BIOS default configurations is current. In steps 3-4, the BIOS can read a "SKU ID" (i.e., a server ID) from a device/interface in the computer system. In step 5, the BIOS can load a BIOS default configuration corresponding to the SKU ID into the NVRAM, and also update the CurSetNum to the SKU ID.

Figure 9:
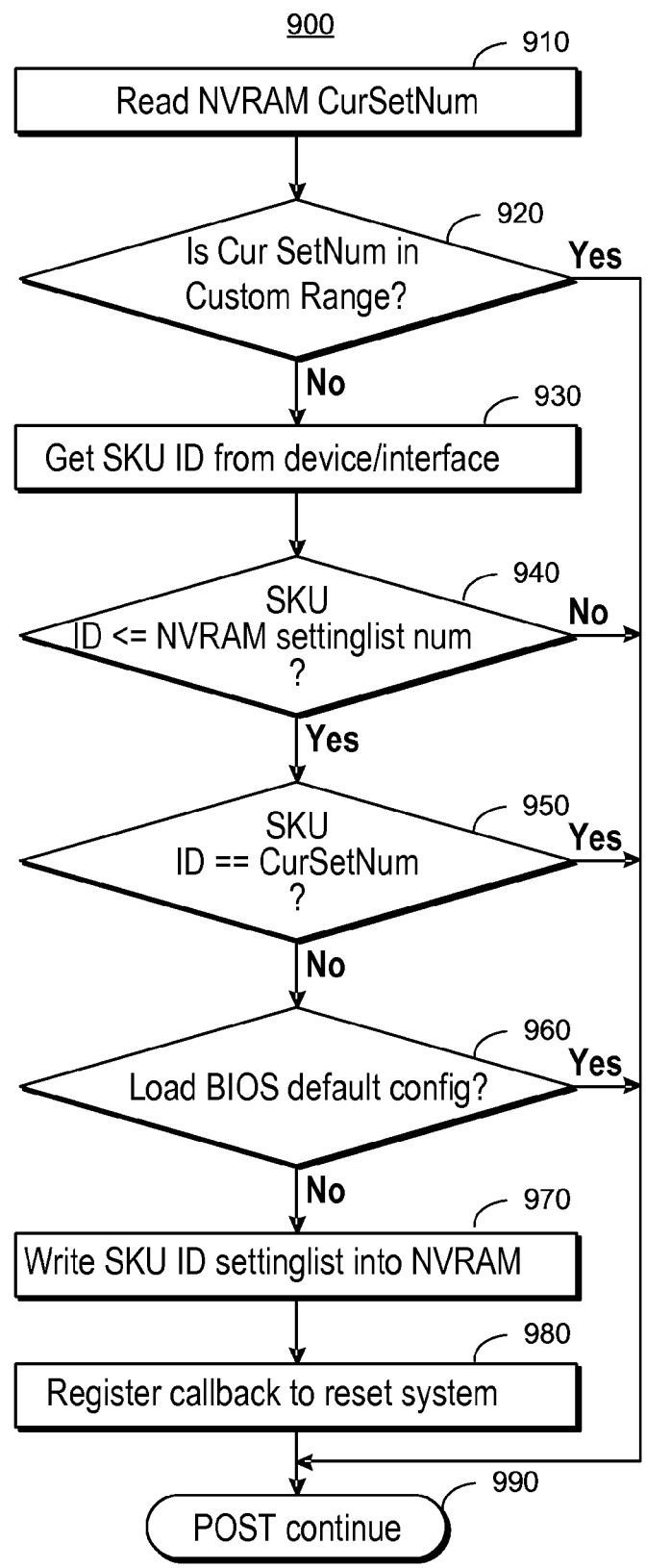
FIG. 9 illustrates a flow chart of an exemplary method for managing BIOS configurations for a computer system.

FIG. 9 illustrates a flow chart 900 of an exemplary method for managing BIOS configurations for a computer system. At step 910, a BIOS of a computer system can read a CurSetNum from a NVRAM.

At step 920, the BIOS can determine whether the CurSetNum is in a custom range. For example, a CurSetNum between 1-10 can indicate that a current BIOS default configuration is one of a plurality of preloaded BIOS default configurations. And, if the CurSetNum is greater than 10, it can indicate that the current BIOS default configuration is a custom BIOS default configuration. If the CurSetNum is in the custom range, the method continues to step 990, else to step 930.

At step 930, the BIOS can obtain a SKU ID from a device/interface in the computer system.

At step 940, the BIOS can determine whether the SKU ID is smaller than or equal to a "NVRAM settinglist num". The NVRAM settinglist num can indicate how many configurations (e.g., a count of ten) are in the plurality of BIOS default configurations. If the SKU ID is greater than the NVRAM settinglist num, it can indicate that the SKU ID does not have a corresponding preloaded BIOS default configuration and the method continues to step 990, else to step 950.

At step 950, the BIOS can determine whether the SKU ID is equal to the CurSetNum. If the SKU ID is equal to the CurSetNum, it can indicate that a BIOS default configuration that corresponds to the SKU ID has already been loaded and the method continues to step 990, else to step 960.

At step 960, the BIOS can determine whether to load the default BIOS configuration. If the BIOS determines to load the default BIOS configuration, the method continues to step 990, else to step 970. For example, an administrator can command the BIOS to start up the computer system with the current BIOS default configuration without loading a different BIOS default configuration.

At step 970, the BIOS can write a BIOS default configuration corresponding to the SKU ID, "SKU ID settinglist", into the NVRAM. In other words, the SKU ID settinglist can include a BIOS default configuration that corresponds to the SKU ID.

At step 980, the BIOS can register callback to reset (i.e., power cycle) the computer system.

At step 990, the BIOS continues a Power-On Self-Test (POST) procedure to start up the computer system using the current BIOS default configuration.

The various illustrative logical blocks, modules, and circuits described in connection with the disclosure herein can be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The operations of a method or algorithm described in connection with the disclosure herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

In one or more exemplary designs, the functions described can be implemented in hardware, software, firmware, or any combination thereof. If implemented in software, the functions can be stored on or transmitted over as one or more instructions or code on a non-transitory computer-readable medium. Non-transitory computer-readable media includes both computer storage media and communication media including any medium that facilitates transfer of a computer program from one place to another. A storage media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blue ray disc where disks usually reproduce data magnetically, while discs reproduce data optically with lasers. Combinations of the above should also be included within the scope of non-transitory computer-readable media.

The previous description of the disclosure is provided to enable any person skilled in the art to make or use the disclosure. Various modifications to the disclosure will be readily apparent to those skilled in the art, and the generic principles defined herein can be applied to other variations without departing from the scope of the disclosure. Thus, the disclosure is not intended to be limited to the examples and designs described herein, but is to be accorded the widest scope consistent with the principles and novel features disclosed herein.

The invention claimed is:

1. A method for managing Basic Input/Output System (BIOS) configurations for a computer system, the method comprising:
   defining a plurality of BIOS default configurations for the computer system;
   selecting a particular BIOS default configuration from the plurality of BIOS default configurations based at least in part on a server identification (ID) of the computer system or a user command;
   initializing the computer system with the particular BIOS default configuration; and storing a current index value, wherein the current index value is determined based on the particular BIOS default configuration selected from the plurality of BIOS default configurations.

2. The method of claim 1, wherein the plurality of BIOS default configurations corresponds to a plurality of computer system types.

3. The method of claim 1, wherein the plurality of BIOS default configurations corresponds to a plurality of server IDs.

4. The method of claim 3, further comprising obtaining the server ID of the computer system, wherein selecting the particular BIOS default configuration comprises selecting one of the plurality of BIOS default configurations that corresponds to the server ID of the computer system.

5. The method of claim 1, wherein defining the plurality of BIOS default configurations comprises obtaining the plurality of BIOS default configurations from a storage device such as a Baseboard Management Controller (BMC), a hard disk drive (HDD), an Electrically Erasable Programmable Read-Only Memory (EEPROM), or a non-volatile random-access memory (NVRAM).

6. The method of claim 1, wherein defining the plurality of BIOS default configurations comprises receiving at least one BIOS default configuration specified by a user.

7. The method of claim 1, wherein the server IDs are Stock Keeping Unit Identifications (SKU IDs).

8. The method of claim 1, wherein the server ID of the computer system is specified by a user.

9. The method of claim 1, wherein selecting the particular BIOS default configuration comprises receiving a specified BIOS default configuration through a Baseboard Management Controller (BMC) from a user.

10. The method of claim 9, wherein the specified BIOS default configuration is not one of the plurality of BIOS default configurations.

11. The method of claim 1, wherein if the current index value is in a predetermined range, the BIOS default configuration is present and the computer system proceeds to Power On Self Test (POST) using the current BIOS default configuration.

12. The method of claim 1, wherein if the current index value is outside a predetermined range, the BIOS obtains the SKU ID from the computer system to determine a BIOS default configuration.

13. The method of claim 12, wherein if the current index value is above a predetermined range, a BIOS default configuration is not present and the computer system proceeds to Power On Self Test (POST).

14. An apparatus configured for managing Basic Input/Output System (BIOS) configurations for a computer system, the apparatus comprising:
   at least one processor configured for defining a plurality of BIOS default configurations for the computer system, selecting a particular BIOS default configuration from the plurality of BIOS default configurations based at least in part on a server identification (ID) of the computer system or a user command, and initializing the computer system with the particular BIOS default configuration;
   wherein the at least one processor is further configured for storing a current index value, wherein the current index value is determined based on the particular BIOS default configuration selected from the plurality of BIOS default configurations.

15. The apparatus of claim 14, wherein the plurality of BIOS default configurations corresponds to a plurality of computer system types.

16. The apparatus of claim 14, wherein the plurality of BIOS default configurations corresponds to a plurality of server IDs.

17. The apparatus of claim 16, wherein the at least one processor is further configured for obtaining the server ID of the computer system, wherein selecting the particular BIOS default configuration comprises selecting one of the plurality of BIOS default configurations that corresponds to the server ID of the computer system.

18. The method of claim 14, wherein if the current index value is in a predetermined range, the BIOS default configuration is present and the computer system proceeds to Power On Self Test (POST) using the current BIOS default configuration.

19. The method of claim 14, wherein if the current index value is outside a predetermined range, the BIOS obtains the SKU ID from the computer system to determine a BIOS default configuration.

20. The method of claim 19, wherein if the current index value is above a predetermined range, a BIOS default configuration is not present and the computer system proceeds to Power On Self Test (POST).

21. A non-transitory computer-readable storage medium storing executable instructions which cause a data processing device to:
   define a plurality of BIOS default configurations for the computer system;
   select a particular BIOS default configuration from the plurality of BIOS default configurations based at least in part on a server identification (ID) of the computer system or a user command;
   initialize the computer system with the particular BIOS default configuration; and
   store a current index value, wherein the current index value is determined based on the particular BIOS default configuration selected from the plurality of BIOS default configurations.

22. The non-transitory computer-readable storage medium of claim 21, wherein the plurality of BIOS default configurations corresponds to a plurality of computer system types.

23. The non-transitory computer-readable storage medium of claim 21, wherein the plurality of BIOS default configurations corresponds to a plurality of server IDs.

24. The non-transitory computer-readable storage medium of claim 23, wherein the computer-readable medium further causes the data processing device to obtain the server ID of the computer system, wherein selecting the particular BIOS default configuration comprises selecting one of the plurality of BIOS default configurations that corresponds to the server ID of the computer system.

\* \* \* \* \*